US006950587B2

(12) United States Patent
Brandt et al.

(10) Patent No.: US 6,950,587 B2
(45) Date of Patent: Sep. 27, 2005

(54) OPTICAL FIBERS

(75) Inventors: Heinz-Dieter Brandt, deceased, late of Willich (DE); by Martina Brandt, legal representative, Willich (DE); by Franziska Hanne Brandt, legal representative, Willich (DE); by Inken Margarethe Brandt, legal representative, Willich (DE); Wolfgang Ebert, Krefeld (DE); Hans-Josef Behrens, Dormagen (DE); Wilfried Haese, Odenthal (DE); Thomas Föllinger, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/432,496

(22) PCT Filed: Nov. 14, 2001

(86) PCT No.: PCT/EP01/13164

§ 371 (c)(1), (2), (4) Date: Oct. 9, 2003

(87) PCT Pub. No.: WO02/42804

PCT Pub. Date: May 30, 2002

(65) Prior Publication Data

US 2004/0151456 A1 Aug. 5, 2004

(30) Foreign Application Priority Data

Nov. 27, 2000 (DE) ........................................ 100 58 877

(51) Int. Cl.[7] .................................................. G02B 6/22

(52) U.S. Cl. ....................................... 385/128; 385/123

(58) Field of Search ................................. 385/128, 132

(56) References Cited

U.S. PATENT DOCUMENTS

| | | | | |
|---|---|---|---|---|
| 4,522,465 A | | 6/1985 | Bishop et al. | 350/96.3 |
| 4,741,596 A | | 5/1988 | Broer et al. | 350/96.34 |
| 4,919,514 A | * | 4/1990 | Ebert et al. | 385/141 |

FOREIGN PATENT DOCUMENTS

| | | |
|---|---|---|
| DE | 35 22 980 | 1/1986 |
| EP | 125710 | 11/1984 |
| EP | 0 203 327 | 12/1986 |
| EP | 0 327 807 | 8/1989 |
| EP | 0 737 871 | 10/1996 |
| JP | 59-216104 | 12/1984 |
| JP | 59-216105 | 12/1984 |
| JP | 59-218404 | 12/1984 |
| JP | 61-231510 | 10/1986 |
| JP | 61-240206 | 10/1986 |
| JP | 61-245110 | 10/1986 |
| JP | 61-278807 | 12/1986 |

* cited by examiner

*Primary Examiner*—Frank G. Font
*Assistant Examiner*—Eric Wong
(74) *Attorney, Agent, or Firm*—Joseph C. Gil; Aron Preis

(57) ABSTRACT

An optical fiber that contains a core of polycarbonate and a coating is disclosed. The coating is a polymer that contains structural units conforming to specified formulae. Also disclosed is a process for producing the inventive fibers and their use for transmitting optical signals.

8 Claims, No Drawings

OPTICAL FIBERS

The present invention relates to optical fibres comprising a core containing polycarbonate and a coating of special polyacrylates or polymethacrylates, and to a process for producing the above-mentioned optical fibres, the use of the above-mentioned optical fibre for transmitting optical signals in means of transport, and means of transport containing the above-mentioned optical fibres.

Optical fibres serve to transmit optical signals. Optical fibres contain a core made of optically transparent material. The core can, for example, consist of glass or plastics material. The core is also called a fibre. The core or the fibre can have any cross-section and diameter. In practice, cross-section and diameter are selected in accordance with the prevailing technical requirements.

The core of the optical fibre is conventionally coated. The coating can, for example, consist of plastics material or lacquer. The coating provides a certain degree of protection against mechanical influences on the core. The coating also improves the efficiency of optical signal transmission with the optical fibre. In particular therefore, the mechanical and optical properties of the coating are significant.

This system consisting of core and coating can be surrounded by a sheath or a cladding. This serves, for example, as protection against damage and environmental influences.

The transmission of the optical signal, preferably by visible light, takes place primarily in the core in optical fibres. Particular importance is therefore attached to the optical properties of the core.

Optical fibres based on plastics material-coated polycarbonate fibres are known from:

(a) EP-A 0 203 327;
(b) JP-A 84/216 104;
(c) JP-A 84/216 105;
(d) JP-A 84/218 404;
(e) JP-A 86/231 510;
(f) JP-A 86/240 206;
(g) JP-A 86/245 110;
(h) JP-A 86/278 807.

These publications describe optical fibres based on polycarbonate fibres, the polycarbonate core of which is coated with specific fluorine-containing polymers ((a), (e), (f), (h)), with specific mixed polymers of methylmethacrylates, styrene or vinyl toluene and maleic acid anhydride (b), with specific mixed polymers of methylmethacrylates, α-methyl styrene and maleic acid anhydride (c), with specific mixed polymers of methylmethacrylate, α-methyl styrene, styrene and maleic acid anhydride (d) and with silicone resins, silicone acrylate resins, urethane acrylate resins, polyamides or poly-4-methylpentene-1 (g).

The plastics materials hitherto proposed for coating polycarbonate fibres are disadvantageous because they have inadequate heat resistance (b), (c), (d), insufficient elongation at break (b), (c), (d), (g) and/or insufficient adhesion to the polycarbonate (a), (e), (f), (g), (h); are too complex to produce for use on an industrial scale and therefore too expensive ((a), (e), (f), (h)), and/or lead to the formation of stress cracks in the polycarbonate core (g).

It is known to use mixtures of poly- and monofunctional acrylates or methacrylates which can be polymerised by UV radiation to coat glass fibres to be used as optical fibres (see for example EP-A 0 125 710, EP-A 0 145 929, EP-A 0 167 199, DE-A 3 522 980).

These mixtures developed for coating glass fibres are not suitable for polycarbonate fibres as they lead to the formation of stress cracks in the polycarbonate core and in addition, have too high a refractive index.

EP-A 0 327 807 discloses optical fibres with a core made of polycarbonate and a coating of polymerised acrylates and/or methacrylates.

The known optical fibres with polycarbonate core have the disadvantage that the coating has insufficient mechanical strength, in particular has insufficient elongation at break.

The object according to the invention consists therefore in providing optical fibres which do not have this disadvantage.

The object according to the invention also consists in providing a process for producing these optical fibres, and in providing means of transport containing the optical fibres according to the invention.

In the process, the advantageous properties of the polycarbonate fibres, in particular the high transparency, the high refractive index, the high heat resistance, the good mechanical properties, such as the high bending strength, the high tear resistance and the low water absorption capacity, are not to be impaired.

It has accordingly been found that the objects according to the invention can be achieved if the coating of the optical fibre contains certain polymers according to the invention.

The object according to the invention is achieved by optical fibres comprising a core made of polycarbonate and a coating containing a polymer, which contains repeat units, derived from the monomers.

A) one or more different compounds of formula (I)

$$D\!\left(\!-\!\left(O-A_2\right)_r\!-Z_1-(A_1O)_n-\overset{\displaystyle O}{\overset{\|}{C}}-\underset{\displaystyle R_1}{\underset{|}{C}}=CH_2\right)_m, \qquad \text{(I)}$$

in which m represents 2, 3 or 4.

D represents the m-valent radical of an aliphatic or aromatic hydrocarbon, $R_1$ is hydrogen or methyl, $Z_1$ represents a divalent radical of formula (II)

$$-O-\overset{\displaystyle O}{\overset{\|}{C}}-NH-A-NH-\overset{\displaystyle O}{\overset{\|}{C}}-O- \qquad \text{(II)}$$

in which

A is an unsubstituted or substituted divalent radical of an aliphatic, cycloaliphatic, araliphatic or aromatic hydrocarbon, $A_1$ and $A_2$, independently of one another, represent an unsubstituted or substituted divalent radical of an aliphatic hydrocarbon, n represents an integer from 1 to 20, r represents an integer from 1 to 30, B) one or more different compounds of formula (III)

(III)

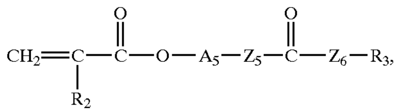

in which $R_2$ is hydrogen or methyl, $A_5$ represents an unsubstituted or substituted divalent radical of an aliphatic or cycloaliphatic hydrocarbon, $Z_5$ and $Z_6$, independently of one another, represent oxygen or N—H and $R_3$ is an unsubstituted or substituted alkyl, cycloalkyl or aralalkyl radical.

Preferred embodiments of the present invention are those in which the radicals characterised as unsubstituted or substituted are unsubstituted.

Optical fibres in which $A_1$ and $A_2$, independently of one another, are selected from the group consisting of —$CH_2$—$CH_2$—, —$CH_2$—$CH(CH_3)$— and —(—$CH_2$—$)_4$— are also preferred from among those aforementioned.

Among the aforementioned optical fibres those are preferred in which m represents 2 or 3, A is selected from the group consisting of

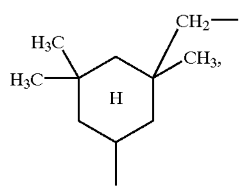

phenylene-$CH_2$-phenylene, cyclohexylene-$CH_2$-cyclohexylene and mixtures thereof and r is 2 to 20.

Among the aforementioned optical fibres those are particularly preferred in which m represents 2, D is —(—$CH_2$—$)_4$—, $R_1$ is H,

A=

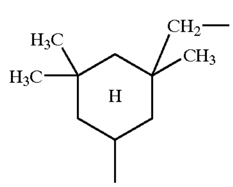

$A_1$ is —(—$CH_2$—$)_2$—, n is 1, $A_2$ is —(—$CH_2$—$)_4$—, r is 3 to 15, $R_2$ is H and $A_5$ is selected from the group consisting of —$CH_2$—$CH_2$—, —$CH_2$—$CH(CH_3)$— and —(—$CH_2$—$)_4$—.

It is preferred that in the aforementioned coated optical fibres the proportion of repeat units in the polymer derived from the monomers mentioned in claim 1 under A) is 25 to 75 wt. % and the proportion of repeat units in the polymer derived from the monomers mentioned in claim 1 under B) is 25 to 75 wt. % and wherein the total proportion of repeat units in the polymer, derived from the monomers mentioned in claim 1 under A) and B) is 50 to 100 wt. %, particularly preferred 100 wt. %.

The object according to the invention is also achieved by a process for producing the optical fibres according to the invention, by coating the core of the optical fibre with a composition containing the monomers A) and B) and the stabilisers and one or more different photoinitiators, wherein the composition on the core is polymerised by UV radiation.

A process in which the proportion of photoinitiator in the composition is 0.1 to 10 wt. % is preferred.

The object according to the invention is also achieved by optical fibres obtainable by the process according to the invention.

The object according to the invention is also achieved by the use of the optical fibre according to the invention in means of transport.

The object according to the invention is also achieved by means of transport containing the optical fibre according to the invention.

The coating preferably contains one or more different stabilisers, preferably in concentrations of 0.01 wt. % to 0.5 wt. %, particularly preferably 0.05 wt. % to 0.3 wt. %.

Compounds suitable as stabilisers, selected from the group consisting of organic phosphates and organic sulphides, are preferred. Most particularly preferred are organic sulphides with sterically hindered phenolic groups.

Stabilisers which contain 3-[3',5'-bis(1",1"-dimethylethyl)-4'-hydroxyphenyl]propionic acid or structures derived therefrom as structural element are also preferred.

The solutions to the object according to the invention which are the subject of the present invention have numerous advantages. The advantageous properties of the polycarbonate fibres, as already mentioned, are not impaired. They are even further augmented by the coating according to the invention in the optical fibres according to the invention. The optical, mechanical and thermal properties of the optical fibres according to the invention are very good. They are insensitive to thermooxidative influences.

The coating according to the invention ensures an elongation at break of over 45%, as will become clear in the examples of the present patent application.

The curing speed of the coatings according to the invention is very high, so advantageous production is possible.

The coatings according to the invention ensure that no stress cracks are formed in the polycarbonate fibre.

Use of the optical fibres according to the invention in means of transport is advantageous because the optical fibres according to the invention permit a reduction in weight compared with known optical fibres, for example those made of glass. In addition, they have advantageous mechanical properties, in particular the optical fibres according to the invention are unbreakable in comparison with optical fibres made of glass. In addition, the optical fibres according to the invention allow much simpler handling and better connections.

Copper cables are conventional in automobiles for signal transmission, in comparison with which a considerable reduction in weight is possible.

Means of transport in the context of the present invention are, in particular, automobiles, rail vehicles, ships and aeroplanes.

The stabilisers according to the invention are known or may be produced by known processes. Some of them are commercially available. They can be obtained, for example, from Ciba Spezialitäten GmbH, Lampertheim, Germany.

The monomers for the coatings according to the invention are known or may be produced by known processes. Some of them are commercially available. Examples of tetravalent radicals of aliphatic or aromatic hydrocarbons for D include the hydrocarbon radicals forming the basis of tetrahydric aliphatic alcohols, such as pentaerythiritol.

Examples of trivalent radicals of aliphatic or aromatic hydrocarbons are, for example, the hydrocarbon radicals forming the basis of aliphatic triols, such as glycerine, trimethylolethane, trimethylolpropane or hexane triol, aromatic tricarboxylic acids, such as benzene-1,2,4-tricarboxylic acids or benzene-1,3,5-tricarboxylic acid or aromatic triisocyanates, such as 2,4,6-toluylene triisocyanate or 4,4',4"-triphenyl methane triisocyanate.

Examples of optionally substituted divalent radicals of aliphatic, cycloaliphatic, araliphatic or aromatic hydrocarbons for D, $A_1$, $A_2$ and $A_5$ are primarily the hydrocarbon radicals forming the basis of aliphatic diols, such as ethylene glycol, 1,2-propane diol, 1,3-propane diol, 2,2-dimethyl-1,3-propane diol, 1,2-butane diol, 1,3-butane diol, 2,3-butane diol, 1,4-butane diol, 1,5-pentane diol, 1,6- and 2,5-hexane diol, dietlhylene glycol, triethylene glycol, dipropylene glycol, 2,2,4-trimethylpentane diol-1,3, 2-methylpentane diol-2,4 and 2-ethylhexane diol-1,3 or cycloalphatic diols, such as 2,2-dimethyl-4,4-dimethyl-cyclobutane diol, 1,2-cyclopentane diol, 1,3-cyclopentane diol, 1,2-, 1,3- and 1,4-cyclohexane diol, 1,4-bishydroxymetlhylcyclohexane, 2,2-bis-(4-hydroxycyclohexyl)-propane, 1-methyl-2,2-bis-(4-hydroxycyclohexyl)-ethane, 2-methyl-2,4-bis-(4-hydroxycyclohexyl)-pentane and bis-hydroxymethyl-hexahydro-4,7-methano-indane.

Examples of optionally substituted, divalent aliphatic, cycloaliphatic, araliphatic or aromatic hydrocarbon radicals for A are primarily the hydrocarbon radicals forming the basis of aliphatic diisocyanates, such as hexamethylene diisocyanate or trimethylhexamethylene diisocyanate-1,6, cycloaliphatic diisocyanates, such as cyclohexane-1,4-diisocyanate, cyclopentane-1,3-diisocyanate, methylene-bis-(4,4'-cyclohexyl)-diisocyanate and 1-isocyanatomethyl-5-isocyanato-1,3,3-trimethylcyclohexane and aromatic diisocyanates such as 2,4- and 2,6-toluylene-diisocyanate, 3,3'-dimethyl-4,4'-diphenylmethane diisocyanate, 4,4'-diphenylmethane diisocyanate and 4,4'-diphenylether diisocyanate.

Examples of optionally substituted alkyl radicals for $R_3$ are $C_1$–$C_{18}$ alkyl radicals such as the methyl, ethyl, propyl, n-butyl, sec.-butyl, i-propyl, tert.-butyl, i-butyl, pentyl, i-pentyl, neopentyl, heptyl, n-hexyl, 2-ethyl-hexyl, nonyl, decyl, cetyl, dodecyl and stearyl radical. Examples of cycloaliphatic radicals are cyclopentyl and cyclohexyl radicals optionally substituted by methyl groups. Examples of araliphatic radicals are primarily the benzyl radical and benzyl radicals substituted by methyl and lower alkoxy groups.

The polycarbonates according to the invention can contain conventional additives.

The optical fibres according to the invention can contain further components. For example, they can contain adhesion-promoting intermediate layers. For example, they can contain protective coatings, particularly those which are flexible but resistant to aqueous solutions and mineral oils and blowing agents, such as thermoplastic polyurethanes and rubbers.

The coatings according to the invention can contain conventional additives.

The coatings according to the invention can, in addition to components A and B, contain conventional additives such as solvents, which are inert to polycarbonates, polymerisation inhibitors, antioxidants, etc.

Photoinitiators are known and commercially available. Examples of photoinitiators are benzoin, benzoin ether, benzyl, benzyl ketals, benzophenone, thioxanthone and derivatives thereof, for example benzylmethylketal and 2-hydroxy-2-methyl-1-phenyl-propan-1-onee.

Polycarbonates and common processes for their production are described, for example, in "Chemistry and Physics of Polycarbonates" Polymer Rev. Vol. 9, Interscience Publishers. They can optionally be produced using known chain terminators (see for example EP-A 0 010 602, DE-A 3 143 252), branching agents such as trisphenols and/or isatinbiscresol (phenol) (see for example DE-A 1 570 533, DE-A 1 595 762, DE-A 2 500 092), stabilisers such as phosphanes and/or phosphites (see for example EP-A 0 143 906, DE-A 21 40 207) and mould release agents (see for example DE-A 2 507 748, DE-A 2 729 485 and DE-A 2 064 095). The polycarbonates are preferably worked up in a known manner by precipitation, spray evaporation or extrusion. The relative viscosity of a 0.5% solution of the polycarbonate in methylene chloride is preferably between 1.18 and 1.32 at 25° C.

Particularly preferred polycarbonates are the homopolycarbonate based on bisphenol A, the homopolycarbonate based on 1,1-bis-(4-hydroxyphenyl)-3,3,5-trimethylcyclohexane, the homopolycarbonate based on one of the following bisphenols (BP-AP)

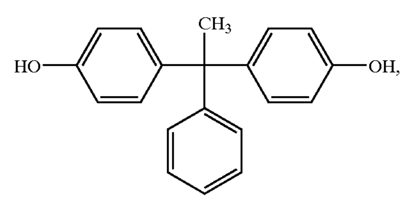

(BP-M)

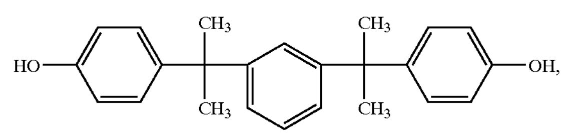

(para-BP-M)

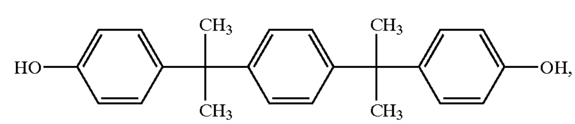

(BP-Z)

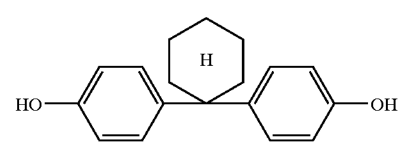

and the copolycarbonates of combinations of the above-mentioned bisphenols, in particular of the copolycarbonate based on the two monomers bisphenol A and 1,1-bis-(4-hydroxyphenyl)-3,3,5-trimethylcyclohexane.

The homopolycarbonate based on bisphenol A is most particularly preferred.

The polycarbonate preferably has a heavy metal content of less than 5 ppm, particularly less than 3 ppm, most particularly less than 0.5 ppm. Low heavy metal contents have the effect of lower optical attenuation in the optical fibre.

In a preferred embodiment of the present invention the polycarbonate contains fewer than 80,000 particles per gram polycarbonate of particles insoluble in the polycarbonate which are 0.3 to 10 μm in size. It preferably contains fewer than 45,000 particles/g which are 0.3 to 0.6 μm in size and fewer than 30,000 particles/g which are 0.6 to 1.0 μm in size and fewer than 3,000 particles/g which are 1.0 to 2.0 μm in size and fewer than 500 particles/g which are 2.0 to 5.0 μm in size and fewer than 200 particles/g which are 5.0 to 10 μm in size. It particularly preferably contains fewer than 30,000 particles/g which are 0.3 to 0.6 μm in size and fewer than 20,000 particles/g which are 0.6 to 1.0 μm in size and fewer than 2,000 particles/g which are 1.0 to 2.0 μm in size and fewer than 300 particles/g which are 2.0 to 5.0 μm in size and fewer than 100 particles/g which are 5.0 to 10 μm in size. It most particularly preferably contains fewer than 25,000 particles/g which are 0.3 to 0.6 μm in size and fewer than 10,000 particles/g which are 0.6 to 1.0 μm in size and fewer than 1,500 particles/g which are 1.0 to 2.0 μm in size and fewer than 50 particles/g which are 2.0 to 5.0 μm in size and fewer than 20 particles/g which are 5.0 to 10 μm in size. It is also preferred if the aforementioned particle content both in the polycarbonate used and in the optical fibre core does not exceed the aforementioned upper limits after processing of the polycarbonate.

The polycarbonate can be produced by known methods, for example by the phase interface process from bisphenol and phosgene, or by the melt transesterification process from carboxylic acid ester and bisphenol.

The viscosity of the compositions to be applied according to the invention to the polycarbonate fibres and which can be polymerised by UV radiation, can vary within wide limits owing to the selection of the molecular weight of the components A and B and/or owing to the ratio of components A and B and can be adjusted to the proposed spinning-off speeds and spinning temperatures of the polycarbonate fibres. The compositions to be used according to the invention preferably have a viscosity of 500 to 10,000 cP at 25° C. The compositions to be used according to the invention can preferably be processed at temperatures of 15 to 140° C.

According to the process, the polycarbonate core of the optical fibre of the polycarbonate fibres can be initially produced and subsequently provided with the coating materials to be applied according to the invention. It is more advantageous, however, to apply the coating immediately after production of the polycarbonate fibres. The thickness of the coating to be applied according to the invention to the polycarbonate fibre is preferably smaller than 50 μm.

The optical fibres according to the invention can be processed to form single-strand or multi-strand cables, in that individual optical fibres or a plurality of optical fibres combined to form a bundle are coated with further polymer layers, for example by coextrusion. The polymer layer in this case is preferably a thermoplastic elastomer.

Owing to the coating, the optical fibres can be stuck together to form bundles or strips.

The diameter of the optical fibres is preferably between 0.05 mm to 5 mm, particularly preferably 0.1 mm to 3 mm, most particularly preferably 0.25 to 1.5 mm.

The optical fibres according to the invention can also be used as lighting elements. For this purpose the surface of the optical fibre is damaged at the desired point. Light is interfaced as a result. Alternatively, the light can be guided to the desired point which is to be illuminated. Fittings, for example in electronic devices such as radios or computers, can, for example, be illuminated in this way.

When producing optical fibres according to the invention, for example by extrusion of the core made of polycarbonate, the process is preferably such that the core has a draw ratio of 1:1 to 1:20, particularly preferably 1:3 to 1:10. An inadequate draw ratio leads to poorer mechanical properties. Too great a draw ratio leads to poor optical properties, i.e. excessive optical attenuation as the refractive index along the cross-section of the core then varies too greatly. In the draw ratio range preferred according to the invention, optical and mechanical properties are in an optimal, properly proportioned ratio to one another.

EXAMPLES

A polycarbonate fibre (diameter: 1.0 mm) was drawn perpendicularly and centrally downward through a vessel which had a nozzle (diameter: 1.2 mm) at its base. The vessel was filled with one of the respective coating mixtures described below. The fibre was uniformly coated with the relevant mixture through the annular gap between fibre and nozzle.

A medium-pressure mercury lamp (rating: 120 W/cm), 20 cm in length was located below the coating vessel and parallel to the thread, the focal line of which lamp was focussed on the thread by means of parabolic specular reflectors in order to obtain as high as possible a luminous efficiency for the UV polymerisation of the coating mixtures.

After passing round a return pulley the coated thread was wound onto a large drum which provided for the drawing of the thread through the unit by means of a motor drive, wherein the speed was constantly 5 m/min.

The thickness of the coating applied to the polycarbonate thread was 10 to 30 μm in all cases.

The resultant polycarbonate fibres provided with UV polymerised coating were stored for 1 month at ambient temperature and subsequently checked for any damage to the polycarbonate core, for example by stress cracks. Table 1 below combines the results obtained with the individual mixtures of the comparison examples and the compositions of the mixtures.

TABLE 1

| Mixture No. | Component A (parts by weight) | | Component B (parts by weight) | Behaviour of the thread coated with the corresponding mixture during bending of the thread about a round rod 10 mm in diameter after 1 month's storage |
|---|---|---|---|---|
| 1 | d | (50) | 1-(N-butyl-carbamoyl)-ethylacrylate (50) | no damage |
| 2 | e | (40) | 2-(N-butyl-carbamoyl)-ethylacrylate (60) | no damage |
| 3 | g | (40) | 2-(N-butyl-carbamoyl)-ethylacrylate (60) | no damage |

Note:
All mixtures 1 to 3 contained 3 parts by weight of the photoinitiator 2-hydroxy-2-methyl-1-phenyl-propan-1-one.

The maximum curing rate of the individual mixtures was determined on the coated films in the simplified manner described below. The results obtained on the films can, however, easily be transferred to fibres.

The mixtures were applied with a hand blade to a polycarbonate sheet (film thickness: 50 μm). The coated polycarbonate sheets were passed at a certain speed through an UV radiation unit (UV laboratory apparatus from U. Steinemann AG; 80 W/cm). The belt speed (=maximum belt speed [m/min]) still permissible for curing of the respective mixture was determined.

| Mixture | Maximum curing speed (m/min) |
|---|---|
| 1 | 60 |
| 2 | >60 |
| 3 | >60 |

The reaction products d, e and g used as component A in mixtures 1 to 3 were obtained as follows:

Reaction Product a:

500 g of a linear polyether (mean molecular weight: approximately 1,000; reaction product of propane diol-1,2 with propylene oxide), 167 g 2-hydroxyethylacrylate, 0.5 g Desmorapid SO (tin-(II)-ethylhexoate from Bayer AG, Leverkusen, Germany) and 0.3 g p-methoxyphenol were placed in a 2 l flask equipped with stirrer, thermometer and gas inlet tube. 265 g isophorone diisocyanate were then added dropwise at 60 to 65° C. while dry air was passed through. The reaction mixture was then stirred at 60 to 65° C. until the NCO content had sunk below 0.1 wt. %.

Reaction Product d:

500 g of a linear polypropylene glycol (mean molecular weight: 2,000), 250 g 2-hydroxyethylacrylate and 290 g isophorone diisocyanate were reacted in the manner described for reaction product a).

Reaction Product e:

500 g of a hydroxyl group-containing linear polyester (mean molecular weight: 1,000; hydroxyl value 112; reaction product of adipic acid and neopentylglycol), 40 g acrylic acid, 2 g p-toluene sulphonic acid, 0.3 g p-methoxyphenol, 0.3 g di-tert.-butyl-hydroquinone and 190 g toluene were placed in a 1 l flask equipped with stirrer, thermometer, gas inlet tube and water separator and heated to reflux temperature while air was passed through. After separation of the theoretical quantity of water the toluene was distilled off under vacuum.

The product obtained was then placed in a 1 l flask equipped with stirrer, thermometer and gas inlet tube and 0.1 g Desmorapid SO and 0.05 g di-tert.-butyl-hydroquinone were added and the mixture heated to 60 to 65° C. 50 g isophorone diisocyanate were added dropwise at this temperature while dry air was passed through. The reaction mixture was then stirred at 60 to 65° C. until the NCO content had sunk below 0.1 wt. %.

Reaction Product g:

600 g of a linear hydroxyl group-containing polyester (mean molecular weight: 2,000; reaction product of adipic acid with ethylene glycol, diethylene glycol and butane diol), 22.7 g acrylic acid, 3.1 g p-toluene sulphonic acid, 0.3 g p-methoxyphenol, 0.3 g di-tert.-butyl-hydroquinone and 220 g toluene are reacted in the manner described for reaction product d) and after removal of the toluene reacted with 31.6 g isophorone diisocyanate, also in the manner described for reaction product e).

Example According to the Invention (Example 4)

Component A:

56.62 kg hydroxyethyl acrylate, 0.0483 kg di-tert.-butyl-hydroquinone and 0.0483 kg Desmorapid SO were placed in a reactor and heated while stirring to 40° C. 200 l air/h were passed through during heating and the subsequent reaction. Once 40° C. had been reached, 48.28 kg n-butylisocyanate were added dropwise in 8 h. Care was taken to ensure that the reaction temperature did not exceed 45° C. The mixture was then stirred for 2 h at 45° C., was then heated to 60° C. and stirred for 4 h at this temperature. A sample demonstrated a NCO content of less than 0.1 wt. %.

Component B:

37.36 kg poly-THF were introduced with 0.2 kg di-tert.-butyl-hydroquinone and 0.1 kg Desmorapid SO and 32.56 kg hydroxyethylacrylate and heated while stirring to 40° C. 200 l air/h were passed through during heating and the subsequent reaction. Once 40° C. had been reached, 32.56 kg isophorone diisocyanate were added dropwise in 8 h. Care was taken to ensure that the reaction temperature did not exceed 45° C. The mixture was then stirred for 2 h at 45° C., was then heated to 60° C. and stirred for 4 h at this temperature. A sample demonstrated a NCO content of less than 0.1 wt. %.

Component C:

200 g Irganox 1035

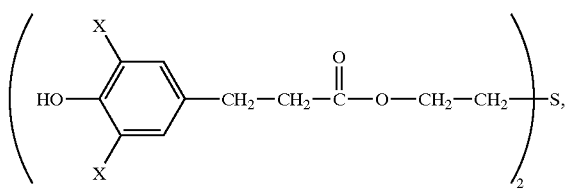

Sold Commercially by Ciba

Preparation of the Coating:

99.5 kg component B and 0.2 kg C were introduced with 597 g Darocur 1173 and 199 g of the stabiliser mentioned below and heated to 50° C. 99.5 kg component A were rapidly added. After mixing, the coating was filtered at 50 to 60° C. and 3 bar by a Seitz filter in a container lined with polyethylene.

Darocur 1173 is a commercial product from Merck in Darmstadt, Germany. It is

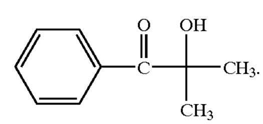

Seitz filters are three-layer depth filters, the first layer of which consists of a kieselgulir cellulose layer, which becomes increasingly fine-pored with increasing depth, followed by a kieselguhr-tight cellulose layer and a polymer-compressed fibre layer to finish. This type of filter construction prevents clogging up of the filter and, in terms of the filtration effect, surpasses much finer-pored metallic sintering sheets.

The coating agent was filtered in a PE-lined flask.

Results of the elongation at break measurement:

| | |
|---|---|
| Comparison test 1: | 35% |
| Comparison test 2: | 40% |
| Comparison test 3: | 15% |

Example according to the invention: 60%

The elongation at break was measured as follows:

A film of the cladding to be tested was doctored onto a glass plate. The thickness of the film was 100 $\mu$m. The film was cured by UV using an irradiation apparatus. 1 cm wide and 15 cm long strips were cut from the centre of the lacquer film produced in this way using a razor blade. One end of the lqcquer strip was fixed and a mark made 10 cm from this fixing. The end which was not fixed was uniformly wound on a thin shaft until the lacquer tore. The distance which the mark, which was originally at 10 cm, had covered was noted. The elongation at break resulted then from: elongation at break=breaking length (cm)×100/10.

What is claimed is:

1. Optical fibre comprising a core made of polycarbonate and a coating containing a polymer, which contains repeat units, derived from the monomers A) one or more different compounds of formula (I)

$$D\left(-(O-A_2)_r-Z_1-(A_1O)_n-\overset{\displaystyle O}{\overset{\|}{C}}-\underset{\displaystyle R_1}{\underset{|}{C}}-CH_2\right)_m, \quad (I)$$

in which m represents 2

D represents —(—$CH_2$—)$_4$—, $R_1$ is hydrogen or methyl, $Z_1$ represents a divalent radical of formula (II)

$$-O-\overset{\displaystyle O}{\overset{\|}{C}}-NH-A-NH-\overset{\displaystyle O}{\overset{\|}{C}}-O- \quad (II)$$

in which

A is an unsubstituted or substituted divalent radical of an aliphatic, cycloaliphatic, araliphatic or aromatic hydrocarbon, $A_1$ and $A_2$, independently of one another, represent a member selected from the group consisting of —$CH_2$—$CH_2$—, —$CH_2$—$CH(CH_3)$— and —(—$CH_2$—)$_4$—, n represents an integer from 1 to 20, r represents an integer from 1 to 30, B) one or more different compounds of formula (III)

$$CH_2{=}\underset{\displaystyle R_2}{\underset{|}{C}}-\overset{\displaystyle O}{\overset{\|}{C}}-O-A_5-Z_5-\overset{\displaystyle O}{\overset{\|}{C}}-Z_6-R_3, \quad (III)$$

in which $R_2$ is hydrogen or methyl, $A_5$ represents an unsubstituted or substituted divalent radical of an aliphatic or cycloaliphatic hydrocarbon, $Z_5$ and $Z_6$, independently of one another, represent oxygen or N—H and $R_3$ is an unsubstituted or substituted alkyl, cycloalkyl or aralalkyl radical said coating containing 0.01 to 0.5% relative to its weight of a stabilizer selected from the group consisting of organic phosphate and organic sulphide.

2. Optical fibre according to claim 1, wherein

A is selected from the group consisting of

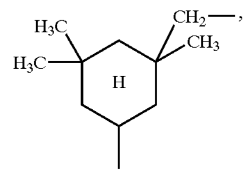

phenylene-$CH_2$-phenylene, cyclohexylene-$CH_2$-cyclohexylene and mixtures thereof and r is 2 to 20.

3. Optical fibre according to claim 1, wherein $R_1$ is H,

A=

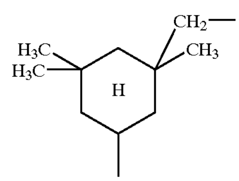

$A_1$ is —(—$CH_2$—)$_2$—, n is 1, $A_2$ is —(—$CH_2$—)$_4$—, r is 3 to 15, $R_2$ is H and $A_5$ is selected from the group consisting of —$CH_2$—$CH_2$—, —$CH_2$—$CH(CH_3)$— and —(—$CH_2$—)$_4$—.

4. Optical fibre according to claim 1, wherein the proportion of repeat units in the polymer derived from the monomers mentioned in claim 1 under A) is 25 to 75 wt. % and the proportion of repeat units in the polymer derived from the monomers mentioned in claim 1 under B) is 25 to 75 wt. % and wherein the total proportion of repeat units in the polymer derived from the monomers mentioned in claim 1 under A) and B) is 50 to 100 wt. %.

5. Process for producing the optical fibre according to claim 1, comprising coating the core of the optical fibre with a composition containing the monomers A) and B) and the stabiliser and one or more different photoinitiators, wherein the composition on the core is polymerised by UV radiation.

6. Process according to claim 5, wherein the proportion of photoinitiator in the composition is 0.1 to 10 wt. %.

7. Optical fibre obtained by the process of claim 5.

8. A process of using the optical fibre according to claim 1 comprising transporting an optical signal.

* * * * *